United States Patent

Terpstra

[11] Patent Number: 5,246,096
[45] Date of Patent: Sep. 21, 1993

[54] ROTATE/TRANSLATE CONVEYOR MODULE

[75] Inventor: Paul D. Terpstra, Janesville, Wis.

[73] Assignee: Giddings & Lewis, Inc., Fond du Lac, Wis.

[21] Appl. No.: 865,873

[22] Filed: Apr. 9, 1992

[51] Int. Cl.⁵ .................................................. B65G 37/00
[52] U.S. Cl. ..................................... 198/372; 198/787; 198/786
[58] Field of Search ............... 198/372, 787, 412, 416, 198/463.4, 786; 193/35 MD

[56] References Cited

U.S. PATENT DOCUMENTS

| | | | |
|---|---|---|---|
| 2,762,487 | 9/1956 | Temple | 198/463.4 |
| 3,679,043 | 7/1972 | Becker | 193/35 MD |
| 4,019,627 | 4/1977 | Eggert et al. | 198/786 |
| 4,180,150 | 12/1979 | Moore | 198/787 X |
| 4,787,808 | 11/1988 | Shimoji et al. | 193/35 MD X |
| 4,907,692 | 3/1990 | Sogge | 198/786 |
| 4,978,272 | 12/1990 | Leon | 193/35 MD X |
| 4,981,209 | 1/1991 | Sogge | 198/786 |
| 5,074,405 | 12/1991 | Magolske et al. | 193/35 MD |

FOREIGN PATENT DOCUMENTS

| | | | |
|---|---|---|---|
| 2515009 | 10/1976 | Fed. Rep. of Germany | 198/787 |
| 0013509 | 1/1990 | Japan | 198/372 |

*Primary Examiner*—Robert P. Olszewski
*Assistant Examiner*—Cheryl L. Gastineau
*Attorney, Agent, or Firm*—Donald Cayen

[57] ABSTRACT

A rotate/translate conveyor module enables a workpiece to be selectively rotated and translated between adjacent sections of a conveyor without having to be lifted above the plane of the adjacent conveyor sections. The rotate/translate conveyor module comprises a plurality of roller modules that are arranged along the path of the workpiece. Each roller module has at least one roller that is driven by an independent electric motor. The rollers of the roller modules support the workpiece in the same plane as the rollers of the conveyor sections. In one embodiment, four roller modules are symmetrically located about the workpiece path, with the longitudinal axes of the rollers intersecting at 90 degrees and at a point on the workpiece path. By operating the electric motors in different combinations of directions, four translational and two rotational motions can be imparted to the workpiece. The conveyor module is thus able to accept a workpiece from an adjacent upstream conveyor section and selectively reorient it by rotating it on the conveyor module and then translate the workpiece downstream to an adjacent downstream conveyor section. The downstream conveyor section may be in line with the adjacent upstream conveyor section, or it may be perpendicular thereto. Side guide mechanisms guide the workpiece as it is translated along the conveyor module. Center guide mechanisms prevent translation of the workpiece during rotation thereof on the rollers.

25 Claims, 5 Drawing Sheets

ROTATE/TRANSLATE CONVEYOR MODULE

BACKGROUND OF THE INVENTION

1. Field of the Invention

This invention pertains to transporting objects, and more particularly to apparatus for orienting workpieces and propelling them along selected paths.

2. Description of the Prior Art

It is well known to transport workpieces along elongated paths between work stations located along the paths. A rather specialized application of workpiece transporting equipment involves conveyors, such as roller conveyors, that support either the workpieces or workpiece carrying pallets. Examples of prior conveyors for propelling workpieces may be seen in U.S. Pat. Nos. 3,716,129; 3,810,538; 3,960,262; 4,108,303; 4,109,783; 4,174,777; 4,227,607; 4,240,538; and 4,817,784.

Change of direction of a workpiece along a conveyor path may generally be accomplished in one of four ways. First, the conveyor may be constructed with a rather large radius corner, such as is shown in U.S. Pat. No. 4,096,942. That construction enables a pallet to change direction with minimum expense or complexity.

It is also possible to use turntable corners for changing the direction of a workpiece on a conveyor. Turntable corners have the advantage of occupying less space than large radius corners. In addition, turntable corners can be used to change the orientation of a workpiece without necessarily changing its translational direction along a path. Turntable corners are also capable of diverting a workpiece or pallet from one path to an intersecting path. For example, turntable corners can rotate 90 degrees and transfer a workpiece to a branch path. Turntable corners are also capable of rotating 180 degrees and continuing to propel the workpiece in the initial direction. Additionally, turntable corners can merely propel a workpiece downstream without imparting any rotary motion to it. U.S. Pat. No. 3,530,571 shows a conveyor system with multiple paths and turntable corners at the junctions of various paths. U.S. Pat. No. 5,086,910 describes an exemplary conveyor system that includes both large radius corners and turntable corners.

Another mechanism that reorients and redirects workpieces along a conveyor path is a lift and rotate mechanism. Those mechanisms lift a workpiece, rotate it, and then lower it back to the plane of the conveyor. A lift and rotate mechanism is required if a 90 degree change in workpiece orientation relative to its direction of travel is required. Such lift and rotate mechanisms are large and sturdily built in order to handle heavy workpieces. In particular, their bearings must be adequate to handle heavy weights. They are also quite complicated because the lifting plates must clear their propelling rollers. Because of their size and weight, it is quite difficult to operate them manually if a failure of the turntable mechanism occurs. A closely related disadvantage of lift and rotate devices is their high cost of construction and maintenance.

Another prior device for changing the direction of a workpiece along a path is a lift and transfer mechanism. A lift and transfer mechanism lifts the workpiece from one conveyor path and then transfers it to a branch path that is at a higher elevation. Like the lift and rotate mechanisms, lift and transfer mechanisms must be large, expensive, and complicated in order to handle heavy workpieces. If a failure should occur, the lift and transfer function is very difficult to perform manually.

It is therefore highly desirable to develop an improved turning corner for workpiece handling conveyor systems.

SUMMARY OF THE INVENTION

In accordance with the present invention, a versatile rotate/translate conveyor module is provided that can change the direction and orientation of a workpiece propelled downstream along a path. This is accomplished by apparatus that includes several roller modules located in the workpiece path and oriented at predetermined angles to each other and to the workpiece path.

The workpiece path upstream and downstream of the rotate/translate conveyor module may be defined by conventional conveyors. There maybe more than one path leading downstream from the conveyor module, as, for example, a main downstream path and a branch path. The conveyor module comprises a frame that is joined to the downstream end of the adjacent upstream conveyor section and to the upstream ends of the adjacent downstream conveyor sections. The conveyor module frame includes a heavy horizontal plate that supports the roller modules. Each roller module includes a roller. The upper surfaces of the rollers are coplanar with each other and with the upper surfaces of the rollers of the upstream and downstream conveyor sections.

Each of the rotate/translate conveyor module rollers is rotatingly driven independently of the other rollers by a reversible motor and a suitable mechanical drive train. Any suitable motor and drive may be used, but electric torque motors and belt and sprocket drives are preferred. Each of the torque motors is controlled as to direction and to the state of being energized or deenergized independently of the other motors.

In the preferred embodiment of the invention, four roller modules are employed. The four roller modules are grouped into two pairs. In the first pair, the longitudinal axes of the rollers of first and second roller modules are coaxial. In the second pair, the longitudinal axes of the rollers of third and fourth roller modules are coaxial. The common longitudinal axis of the rollers of the first pair of roller modules intersects at 90 degrees with the common longitudinal axis of the rollers of the second pair of roller modules. The point of intersection of the two common longitudinal axes of the first and second pairs of roller modules lies on the longitudinal centerlines of the adjacent upstream and downstream conveyor sections. The two common longitudinal axes of the roller modules intersect the common longitudinal centerline of the upstream and downstream conveyor sections at 45 degrees.

In operation, a workpiece, which is usually supported on a pallet, is propelled in a downstream direction onto a rotate/translate conveyor module from the adjacent upstream conveyor section. As the leading edge of the pallet approaches the conveyor module, the motors of the roller modules are energized by appropriate controls. The directions of the motor rotations are chosen such that the associated rollers have components of motion in the downstream direction relative to the adjacent upstream conveyor section. The roller modules thus propel the pallet completely onto the conveyor module. At that point, the motors of all four roller modules may be deenergized.

With the pallet and workpiece supported on a rotate/translate conveyor module having four roller modules, the conveyor module is capable of imparting six different motions to them. The first motion is a translation in the form of a straight line continuation of the downstream motion from the adjacent upstream conveyor section onto the conveyor module. That is, the conveyor module continues to propel the pallet in a straight line onto the adjacent downstream conveyor section. To produce that motion, the motors of the four roller modules are energized in the same combination of directions as they were when the conveyor module accepted the pallet propelled to it from the adjacent upstream conveyor section.

The second motion is a downstream translation at a 90 degree angle to the downstream motion of the upstream conveyor section adjacent the rotate/translate conveyor module. To produce that motion, the motors of the four roller modules are energized in a second combination of directions such that each roller rotates with a component of motion in the new downstream direction.

The third motion is a downstream motion in the direction opposite the direction of the second motion. The third motion is produced by energizing the roller module motors to rotate their respective rollers in the opposite directions from the directions that produced the second motion.

The fourth motion is a reversal of the initial downstream motion of the workpiece onto the rotate/translate conveyor module. To produce the fourth motion, all the rollers of the four roller modules are rotated oppositely from their respective directions that produced the first pallet and workpiece motion. The former adjacent upstream conveyor section thus becomes a downstream section.

The rotate/translate conveyor module is also capable of bidirectionally rotating a pallet and workpiece supported on the roller modules. For that purpose, all the roller module motors are energized to rotate the respective rollers in the same direction. The result is that the pallet rotates in a first direction about a vertical axis but without requiring any rotation of the conveyor module frame. Finally, the pallet can be rotated about a vertical axis in a second rotational direction opposite the first rotational direction by reversing the directions of the rollers that produced the first rotational direction.

Further in accordance with the present invention, the pallet is guided as it undergoes the translational or rotational motions produced by the rotate/translate conveyor module. To guide the pallet during translation, the conveyor module is constructed with four side guide mechanisms. The side guide mechanisms are mounted to the conveyor module frame so that a side guide mechanism lies in each of the paths leading to and from the rotate/translate conveyor module. Each side guide mechanism includes a set of brackets that pivotally support a lever. Upstanding from the lever are two or more rollers. Each set of brackets also supports an actuator. Each actuator is pivotally connected to an associated lever. The actuator is operated to pivot the lever between a raised position and a lowered position. When the lever is in the raised position, its rollers block the path of the pallet. The lever rollers are so located, however, that they guide the pallet along paths perpendicular to the blocked path. When the lever is pivoted by the actuator to its lowered position, the lever rollers are below the plane of the pallet, so the rollers do not block the pallet path. A pallet is thus free to be propelled over the bracket, actuator, and lowered lever and rollers in that direction.

The side guide mechanisms are individually operable to suit the particular motions that the roller modules impart to the pallet and workpiece. Specifically, the levers that lie in a particular path of a pallet are in their lowered positions when the pallet is translated along that path onto or off of the conveyor module. The levers that lie in the paths perpendicular to the direction of pallet motion are in their raised positions such that the rollers of those levers guide the pallet during translation thereof.

To guide a pallet and workpiece during rotation, the rotate/translate conveyor module is designed with at least one and preferably two center guide mechanisms that selectively engage the underside of a workpiece or of a workpiece carrying pallet. In one embodiment of the invention, the center guide mechanisms are comprised of two sets of brackets mounted to the rotate/translate conveyor module frame. A lever is pivotally supported by each set of brackets. Each lever carries a pair of rollers. Actuators are used to pivot the levers between respective upper and lower positions. When the levers are in their upper positions, the rollers thereon enter a circular opening in the center of an overhead pallet or workpiece with the rollers adjacent the wall of the circular opening. When the actuators pivot the lever to their lower positions, the rollers are below the level of the pallet or workpiece. The center guide mechanisms are operated such that their lever rollers are always in their respective lower positions when a ballet is translated onto or off of the rotate/translate conveyor module. The center guide mechanisms are operated to raise the levers plates and rollers whenever a pallet is to be rotated. During rotation, the side guide mechanisms are always in their respective lowered positions.

Other advantages, benefits, and features of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
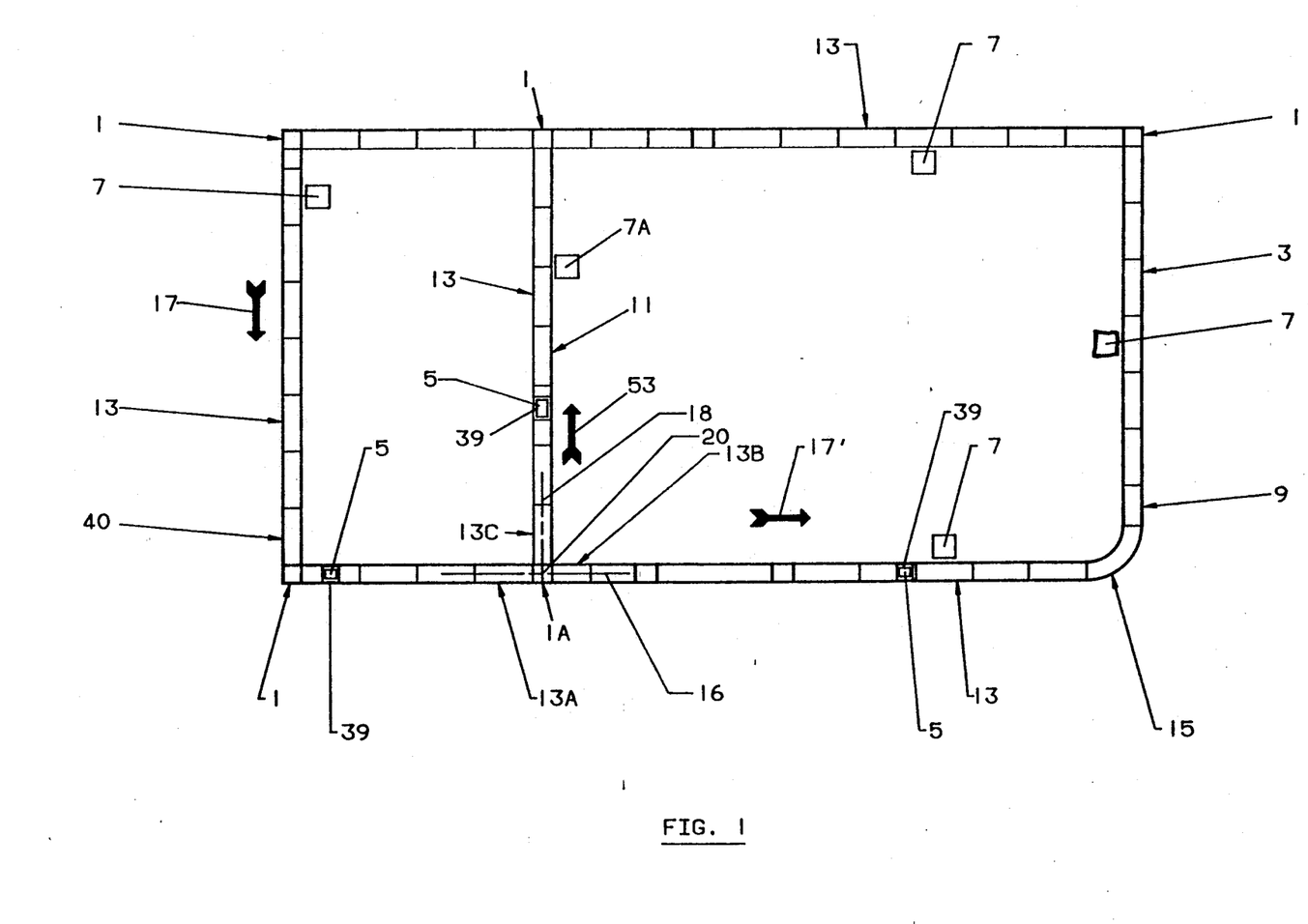
FIG. 1 is a schematic top view of a typical workpiece handling system that advantageously employs the rotate/translate conveyor module of the present invention.

Referring to FIG. 1, several rotate/translate conveyor modules 1, 1A are illustrated that include the present invention. The rotate/translate conveyor modules find particular usefulness as integral parts of a manufacturing system conveyor 3. The conveyor 3 propels workpieces, typically represented at reference numerals 5, between work stations typically represented by reference numerals 7 and 7A. However, it will be understood that the invention is also eminently suitable for numerous other applications involving the transfer of objects between selected locations.

The particular conveyor 3 shown is merely representative of a wide variety of configurations that may be custom designed to suit particular workpiece transfer requirements. For convenience and simplicity, the conveyor 3 is shown as having a closed main path 9 and one branch path 11. However, the conveyor main path 9 need not be closed. Further, any number of branch paths 11 can intersect the main path or each other at any required locations. It will also be recognized by those skilled in the art that the work stations 7 can be placed at practically any desired location along the main path 9, and that one or more work stations 7A can be placed at almost any desired location along the branch path 11.

Figure 2:
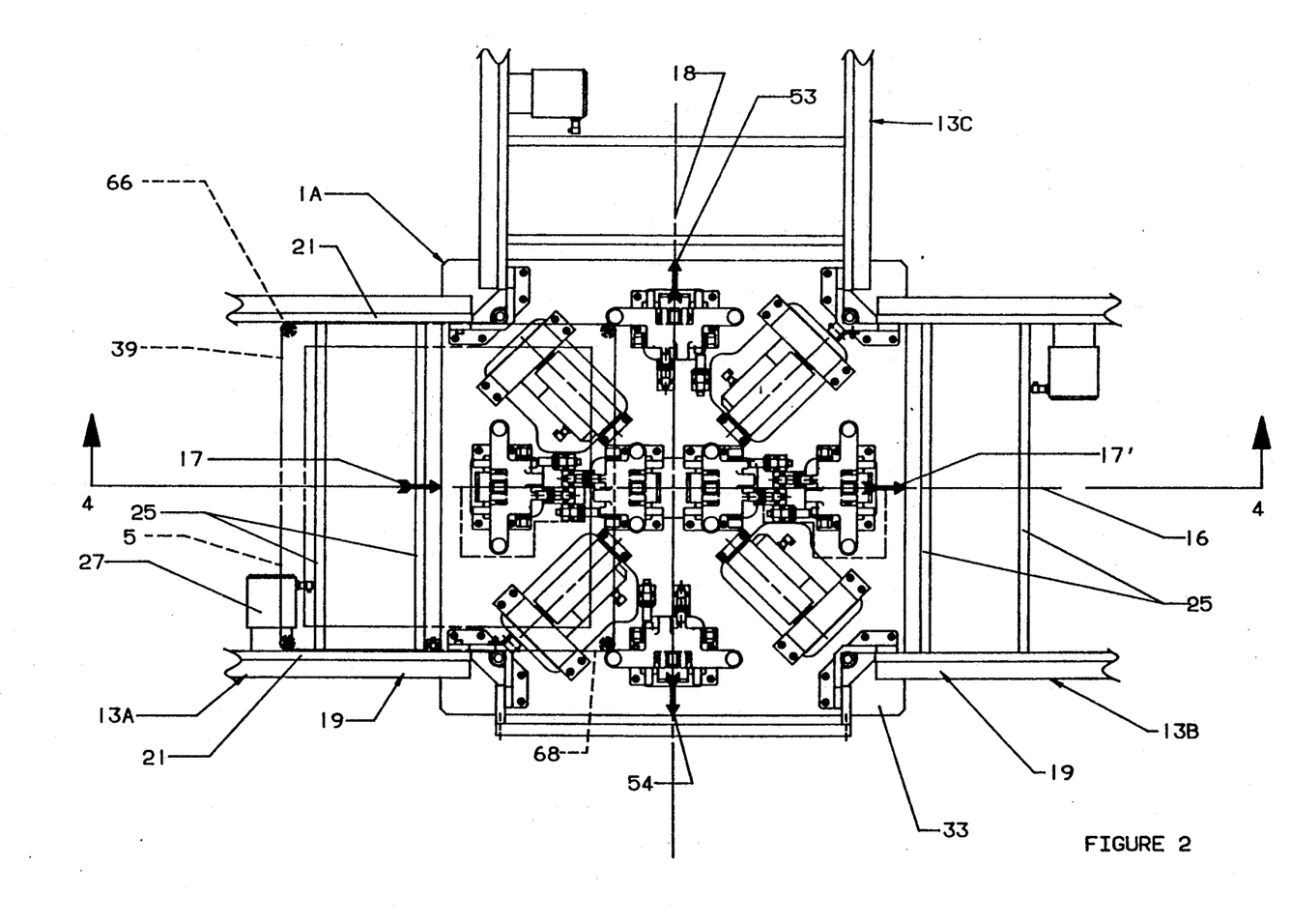
FIG. 2 is a top view on an enlarged scale of the rotate/translate conveyor module and adjacent sections of upstream and downstream conveyor sections.
Figure 3:
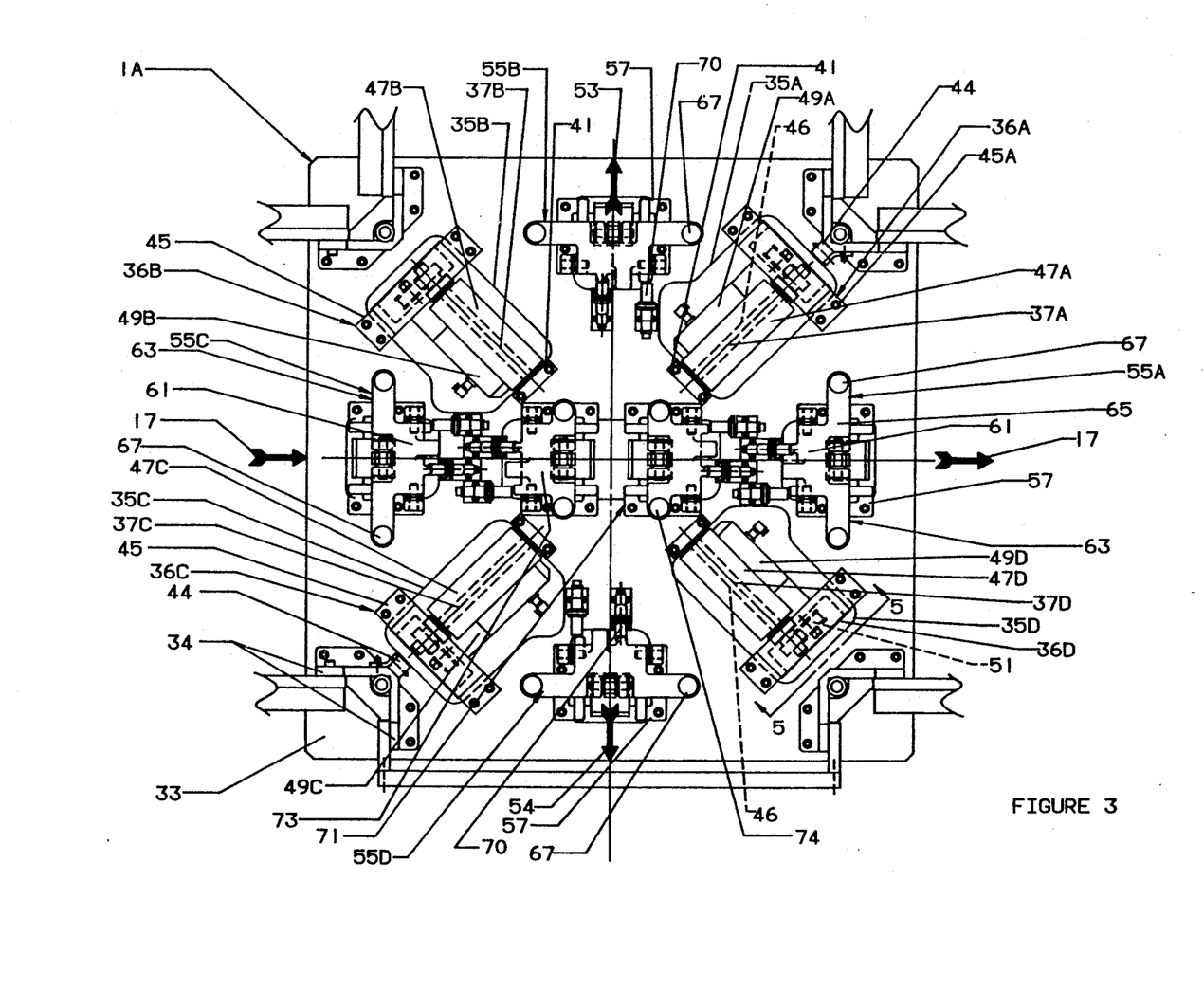
FIG. 3 is a top view on a further enlarged scale of the rotate/translate conveyor module.
Figure 4:
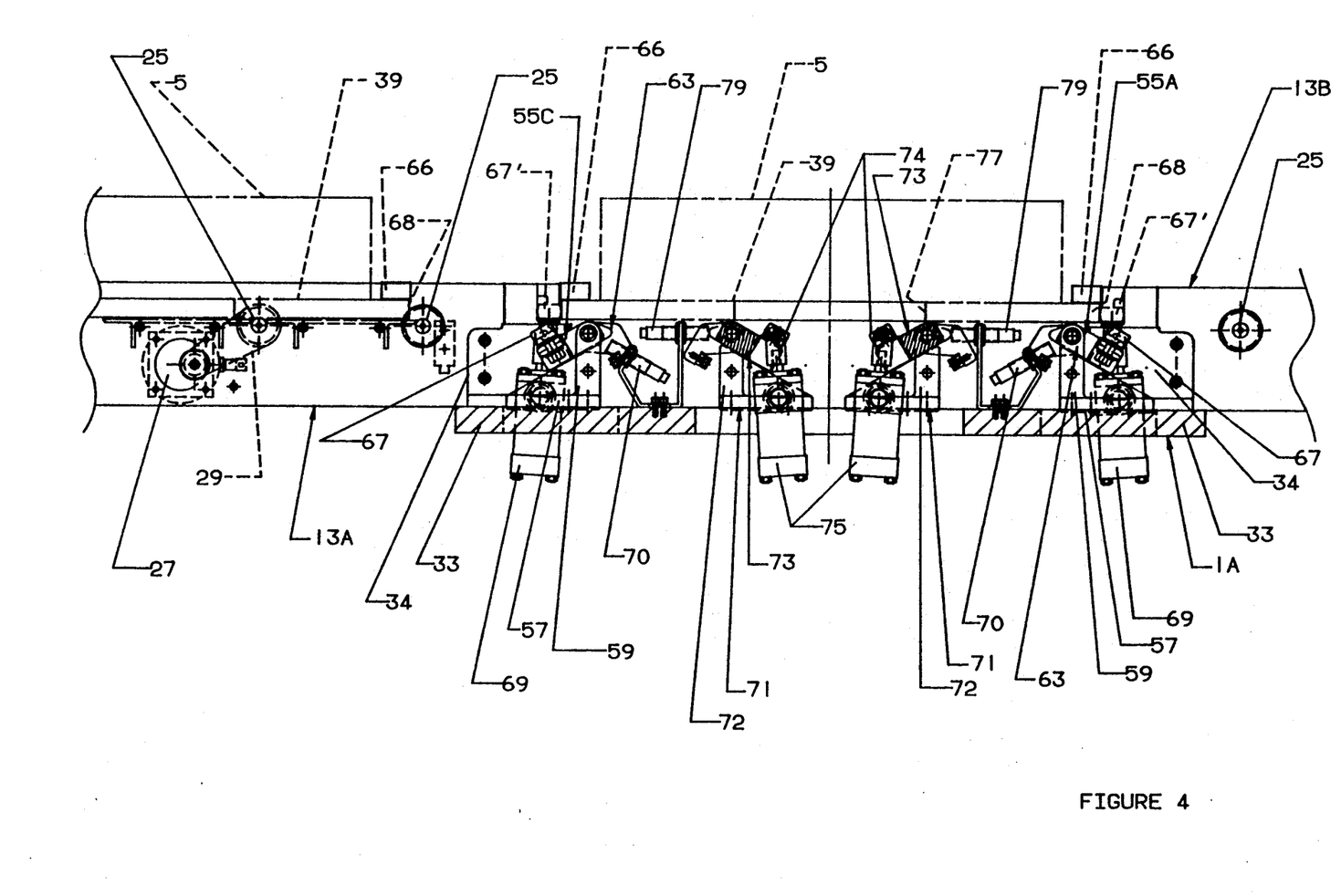
FIG. 4 is a cross sectional view taken along lines 4—4 of FIG. 2.

The particular conveyor 3 shown is comprised of a number of straight sections 13, a large radius corner section 15, and several rotate/translate conveyor modules 1, 1A. The straight sections 13 and radius corner section 15 may be designed according to the description given in U.S. Pat. No. 5,086,910. In that situation, each conveyor straight section, typically represented at reference numerals 13A, 13B, and 13C in FIGS. 2-4, is comprised of a frame 19 supported on the factory floor by appropriate legs, not shown. Each straight section frame 19 may be fabricated as two upstanding parallel plates 21 joined and spaced by suitable cross members, not illustrated in the drawings. A series of rollers 25 are mounted for rotation between the frame plates 21. A suitable diameter for the rollers 25 is approximately 25 millimeters. Each roller 25 is individually driven by a separate motor 27. The motors 27 are individually controlled. Separate drive trains 29 interconnect the associated motors 27 and rollers.

The workpieces 5 are usually supported by and secured to respective pallets, which are represented by phantom lines 39. The pallets 39 are in contact with and supported by the rollers 25 of the conveyor straight sections 13. The pallets may have any size and shape that suit the particular workpieces they are to carry along the conveyor. The pallets are guided along the conveyor sections 13 by rollers 66 that contact the conveyor section frame plates 21. It will be assumed that the pallets 39 and their workpieces 5 are initially propelled in a downstream direction, represented by arrow 17 of FIG. 1, along the left portion 40 of the conveyor main path 9.

The rotate/translate conveyor modules 1, 1A are used to change the direction of propulsion and also the orientation of the pallets 39 and workpieces 5. The structure and operation of all the conveyor modules shown in FIG. 1 are essentially identical, so a description of conveyor module 1A will be sufficient. The rotate/translate conveyor module 1A is shown located between three conveyor straight sections: an adjacent upstream conveyor section 13A and two adjacent downstream conveyor sections 13B and 13C. The straight sections 13A an 13B define a straight path having a common longitudinal centerline 16. The straight conveyor section 13C defines a straight path that has a longitudinal centerline 18 that intersects the longitudinal centerline 16 at point 20.

The conveyor straight section 13A propels a pallet 39 in the downstream direction 17 along the centerline 16 to the rotate/translate conveyor module 1A. The conveyor module 1A then directs the pallet onto either of the adjacent downstream straight sections 13B or 13C. In addition, the conveyor module may change the orientation of the pallet by rotating it about a vertical axis passing through the point 20 before propelling the pallet downstream.

In the illustrated construction, the rotate/translate conveyor module 1A is comprised of a sturdy frame supported on the floor by legs, not shown. As best shown in FIGS. 2 and 3, the frame of the rotate/translate conveyor module ties into the frames 19 of the adjacent conveyor straight sections 13A, 13B, and 13C by means of lugs 34 and appropriate fasteners. The conveyor module frame includes a sturdy horizontal plate 33. Cut into the plate 33 are four generally rectangular openings 35A, 35B, 35C, and 35D.

Figure 5:
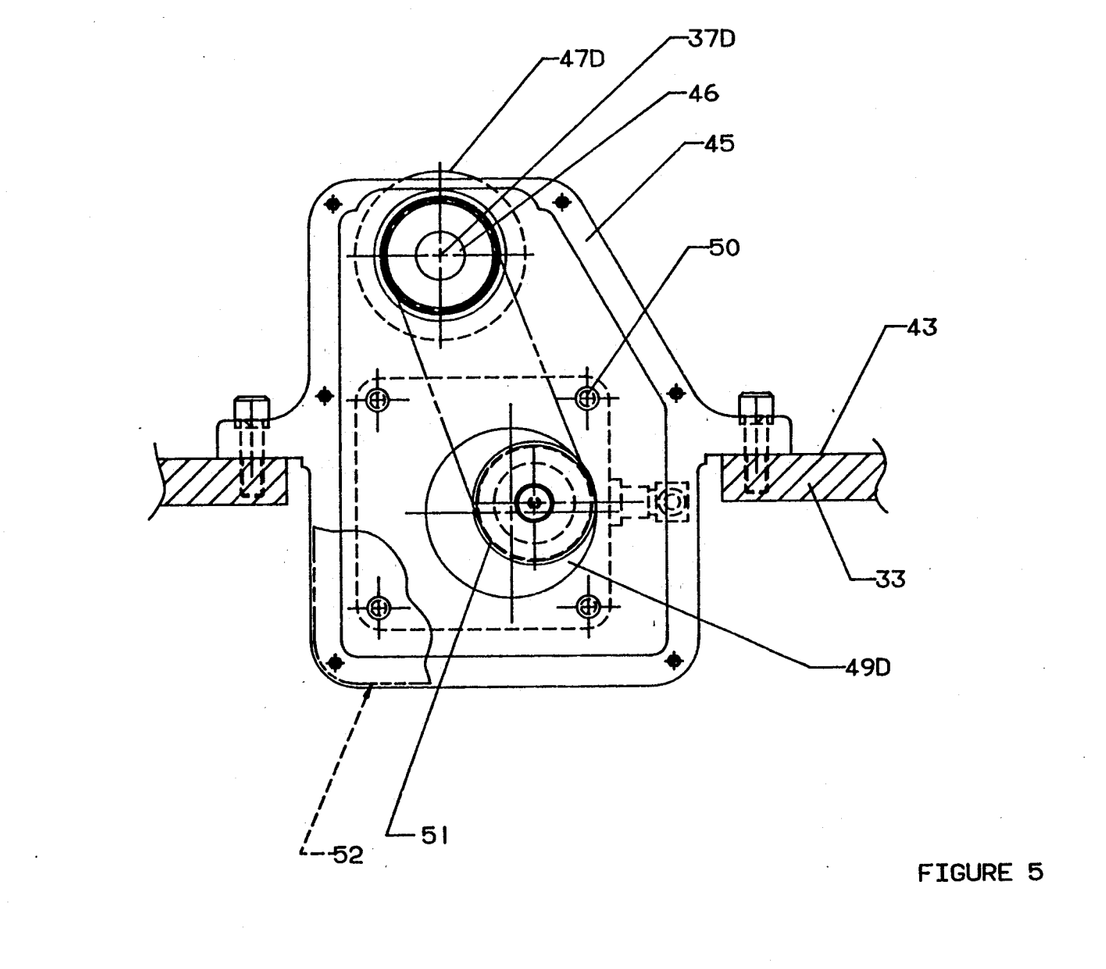
FIG. 5 is an enlarged view taken along lines 5—5 of FIG. 2 and rotated 45 degrees clockwise.

Associated with each opening 35A-35D is a corresponding roller module 36A-36D. Each roller module 36A-36D comprises a block 41 and a housing 45 attached to the top surface 43 of the frame plate 33, FIG. 5. The housings 45 extend vertically through the corresponding plate openings. The blocks 41 and the housings 45 are manufactured with respective journals. The block 41 and housing 45 of each roller module supports the opposite ends of a shaft 46 of the associated roller 47, such that there is a roller 47A-47D in conjunction with each of the respective roller modules 36A-36D.

The rollers 47A-47D have respective longitudinal axes 37A, 37B, 37C, and 37D. The longitudinal axes 37A-37D intersect a vertical line that contains the point 20. Axes 37A and 37C are coaxial, and axes 37B and 37D are coaxial. The coaxial common axis 37A and 37C makes a right angle with the coaxial common axis 37B and 37D. For the perpendicular centerlines 16 and 18 shown, the concentric axis 37A and 37C makes an angle of 45 degrees with the conveyor straight section centerline 16.

The uppermost surfaces of the rollers 47A-47D are coplanar with the uppermost surfaces of the rollers 25 of the straight sections 13 of the conveyor 3. However, it is not necessary that the rollers 47A-47D have the same diameter as the rollers 25. In fact, it is preferred that the rollers 47A-47D have a larger diameter than rollers 25.

The rollers 47A, 47B, 47C, and 47D of the rotate/translate conveyor module 1A are individually and independently powered by respective electric motors 49A, 49B, 49C, and 49D. Each motor 49A-49D is mounted by fasteners 50 to the associated housing 45. A mechanical drive drain 51, such as a belt and pulley or a chain and sprocket, is used to rotate each roller in response to energization of the corresponding motor. Each housing 45 has a protective cover, represented by phantom lines 52 in FIG. 5, attached to it to enclose the drive train 51. It is thus seen that the conveyor module 1A is constructed with four roller modules 36A-36D, and that each roller module includes a motor, a drive train, and a roller.

The motors 49A-49D are reversible, and therefore the rollers 47A-47D are capable of bidirectional rotation. Satisfactory electric motors include those manufactured by the Bodine Electric Company of Chicago, Illinois, as Model Number 481. As a convention, rotation of the rollers is described as they are viewed from the point 20 of the conveyor module 1A.

Because the electric motors 49A-49D are operable independently of each other, the rotate/translate conveyor module 1A is capable of imparting six different motions to a pallet 39. The first motion is that of receiving a pallet presented to it in the downstream direction 17 by the adjacent conveyor straight section 13A. That is, the conveyor module 1A is capable of continuing the downstream translation of the pallet 39 along the centerline 16 from the adjacent upstream section 13A so as to become supported solely by the conveyor module. That first motion is achieved by energizing the conveyor module motors 49A-49D such that the rollers 47A and 47B rotate clockwise and the rollers 47C and 47D rotate counterclockwise. The rollers 47B and 47C have components of motion parallel to the centerline 16, which is in the downstream direction 17. The rollers 47B and 47C also have components of motion perpendicular to the centerline 16 and in opposite directions from each other, as is represented by arrows 53 and 54. The components of motion in the directions 53 and 54 cancel each other, and the rollers 47B and 47C therefore cooperate to translate the pallet 39 from the adjacent upstream conveyor section 13A onto the conveyor module 1A and onto the other two conveyor module rollers 47A and 47D. The rotations of rollers 47A and 47D produce common components of motion parallel to the centerline 16 in the downstream direction 17. The rotations of the rollers 47A and 47D also produce opposed components of motion 53, 54 perpendicular to the centerline 16 that cancel each other. The rollers 47A-47D continue to rotate to propel the pallet 39 along the centerline 16 to the adjacent downstream conveyor straight section 13B in the direction of arrow 17'. Thus, the conveyor module 1A imparts a translatory first motion to the pallet.

The second motion that the rotate/translate conveyor module 1A can impart to the pallet 39 is a translation in the direction of arrow 53 along centerline 18. To produce that motion, the rollers 47A-47D first rotate to produce the first motion described above, but the rollers stop rotating when the pallet is fully on the conveyor module. Then the motors 49B and 49C are energized to rotate the respective rollers 47B and 47C clockwise, and the motors 49A and 49D are energized to rotate the respective rollers 47A and 47D counterclockwise. The result is that the four rollers produce components of motion parallel to the centerline 18 in the direction of arrow 53 to propel the pallet in the direction of arrow 53 along the branch path 11. The components of motion of the four rollers that are perpendicular to the centerline 18 cancel, i.e., the rollers 47C and 47D cancel each other's components of motion perpendicular to the centerline 18, and the rollers 47A and 47B cancel each other's components of motion perpendicular to the centerline 18.

Although not shown in the drawings, it is evident that a branch path could be established on the opposite side of the rotate/translate conveyor module 1A from the branch path 11. In that case, the conveyor module 1A would be capable of imparting a third motion to a pallet 39 on the conveyor module. The third motion would be a translation along the centerline 18 but in the direction of arrow 54. To obtain the third motion, the motors 49A and 49D are energized to rotate the respective rollers 47A and 47D clockwise, and the motors 49B and 49C are energized to rotate the respective rollers 47B and 47C counterclockwise. Such rotation provides components of motion of the four rollers parallel to the centerline 18 and in the direction of arrow 54. As described previously, the components of motion of the four rollers perpendicular to the centerline 18 cancel.

The fourth motion that the rotate/translate conveyor module 1A can impart to a pallet 39 is a translation to the adjacent upstream conveyor section 13A in the direction opposite arrow 17. For that purpose, the motors 49A and 49B are energized to rotate the respective rollers 47A and 47B counterclockwise, and the motors 49C and 49D are energized to rotate the respective rollers 47C and 47D clockwise. The direction of rotation of the rollers 25 of the adjacent upstream conveyor section 13A is reversed to receive the pallet from the conveyor module.

The fifth motion the rotate/translate conveyor module 1A can impart to a pallet 39 is a clockwise rotation about a vertical axis passing through point 20. To obtain that motion, the electric motors 49A-49D are energized to rotate all of the corresponding rollers 47A-47D in clockwise directions.

The sixth motion that the rotate/translate conveyor module 1A can impart to a pallet 39 is a counterclockwise rotation about a vertical axis passing through the point 20. That motion is obtained by energizing all the motors 49A-49D to rotate the respective rollers 47A-47D in counterclockwise directions.

Further in accordance with the present invention, a pallet 39 with its workpiece 5 is guided on the rotate/translate conveyor module 1A while being propelled thereby in both translational and rotational motions. To guide a pallet during translational motions, the conveyor module 1A includes side guide mechanisms 55A-55D. A side guide mechanism 55A-55D is located in each of the paths along which the pallet can be translated.

In the preferred embodiment, each side guide mechanism 55A-55D is comprised of two brackets 57 fastened to the frame plate 33. A pair of upstanding legs 59 (FIG. 4) on each bracket 57 pivotally supports the center leg 61 of a generally T-shaped lever 63. On the opposite ends of a cross leg 65 of each T-shaped lever 63 are rollers 67. A linear actuator 69 is also pivotally connected to each bracket 57. The piston rods of the linear actuators 69 are connected to the center legs 61 of the associated levers 63. The actuators are individually operable to pivot the levers 63 between respective raised positions and lowered positions. FIG. 4 shows the levers 63 in their lowered positions. In that position, the rollers 67 lie below the plane defined by the uppermost surfaces of the rollers 47A-47D and of the conveyor straight section rollers 25, and thus below the level of the pallet 39. When the levers are in their raised positions, the rollers, as shown by phantom lines 67', are above the uppermost surfaces of the roller module rollers and the conveyor straight section rollers.

When the side guide mechanisms 55A-55D are in their raised positions, their rollers 67 are adjacent the side edges 68 of a pallet 39 at the center of the rotate/translate conveyor module 1A; such locations of the raised rollers are shown by phantom lines 67' in FIG. 4. Consequently, when in the raised position, the side guide mechanism rollers block pallet motion along the paths in which the raised side guide mechanisms are located, but the raised rollers simultaneously are able to guide pallet motions in directions perpendicular to the blocked paths. Proximity switches 70 or similar sensors are used to assure that the levers 63 are in their proper raised or lowered positions.

To guide a pallet 39 during rotational propulsion thereof on the rotate/translate conveyor module 1A, at least one and preferably two center guide mechanisms 71 are employed. The center guide mechanisms 71 are generally similar to the side guide mechanisms 55. That is, each center guide mechanism is comprised of a bracket 72 that may be the same as the bracket 57. The center guide mechanism brackets 72 pivotally support respective levers 73. A pair of rollers 74 are attached to each lever 73. Each lever 73 is pivotable between upper and lowered positions by a linear actuator 75. When the linear actuators 75 pivot the levers 73 to their lowered positions, the rollers 74 lie below the uppermost surfaces of the roller module rollers 47A–47D and of the conveyor straight section rollers 25, and thus below the level of the pallet. When the linear actuators 75 operate to pivot the levers 73 to their upper positions, the rollers 74 lie inside a circular bore 77 in the underside of the pallet. The diameter of the pallet bore 77 is slightly larger than the diameter of a circle that contains all the center guide mechanism rollers. Consequently, the pallet is captured against any translational movement when the center guide mechanism actuators are energized to raise their associated rollers inside the pallet bore. In that manner, the pallet is guided by the center guide mechanisms when the roller modules 36A–36D are actuated to rotate the pallet on the conveyor module. Proximity switches 79 or similar sensors are used to assure that the levers 73 are in their correct positions.

In operation, the conveyor upstream straight section 13A adjacent the rotate/translate conveyor module 1A propels a pallet 39 and its workpiece 5 onto the conveyor module. During that process, the levers 63 of the side guide mechanisms 55A and 55C are in the lowered position, and the rollers 67 are in the positions shown by the solid lines of FIG. 4. The levers of the side guide mechanisms 55B and 55D are in their raised positions. The center guide mechanism actuators 75 are actuated to lower their respective levers 73. The motors 49A and 49B are energized to rotate the respective rollers 47A and 47B clockwise, and the motors 49C and 49D are energized to rotate the respective rollers 47C and 47D counterclockwise. The rollers 67 of the side guide mechanisms 55B and 55D guide the pallet. When the pallet is fully on the conveyor module, as detected by sensors 44 any of the four translatory motions and two rotational motions described previously may be imparted to the pallet.

If the pallet 39 is to continue downstream in the direction of arrow 17' onto the adjacent downstream conveyor section 13B, the motors 49A–49D and rollers 47A–47D continue to rotate in the same directions as they did as the pallet was transferred from the adjacent upstream conveyor section 13A to the rotate/translate conveyor module 1A. The levers 63 of the side guide mechanisms 55A and 55C are in the lowered position, and the levers of the side guide mechanisms 55B and 55D remain in the raised positions. The center guide mechanism levers 73 remain in their lowered positions.

If the pallet 39 and workpiece 5 are to be propelled to the adjacent downstream conveyor section 13C in the direction of arrow 53 along path 11, the levers 63 of the side guide mechanisms 55B and 55D are lowered, and the levers of the side guide mechanisms 55A and 55C are raised. Levers 73 of the center guide mechanism 71 remain lowered. The motors 49A and 49D are energized to rotate their respective rollers 47A and 47D clockwise, and the motors 49B and 49C are energized to rotate the rollers 47B and 47C counterclockwise.

If the rotate/translate conveyor module 1A is to change the orientation of the pallet 39 and workpiece 5, all the levers 63 of the side guide mechanisms 55A–55D are lowered. The center guide mechanism actuators 75 are energized to raise their respective rollers 74 into the pallet bore 77. Then the motors 49A–49D are all energized in the same direction to rotate their respective rollers 47A–47D in the same direction, whether clockwise or counterclockwise. When the pallet and workpiece have been rotated to the desired orientation, as detected by sensors 44, the motors stop and the center guide mechanism levers are lowered. The levers of the appropriate side guide mechanisms are raised to suit the next motion of the pallet. The motors are then restarted in the combination of directions required to impart the desired translational motion to the pallet and workpiece to propel them off the conveyor module and onto one of the adjacent conveyor straight sections 13A or 13C, or back to conveyor straight section 13A.

The rotate/translate conveyor modules 1A are capable of imparting both translational and rotational motions to workpieces or workpiece carrying pallets without having to lift them above their normal plane of movement. Consequently, the conveyor modules of the present invention are both less expensive and more reliable than prior means for changing the direction and orientation of conveyor propelled workpieces.

Thus, it is apparent that there has been provided, in accordance with the invention, a rotate/translate conveyor module that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A rotate/translate conveyor module comprising:
   a. a stationary frame; and
   b. roller means attached to the frame for defining a stationary horizontal plane and for supporting and imparting a plurality of selected rotational and translational motions to an object along the plane, wherein the roller means comprises a plurality of roller modules, each roller module comprising:
      i. a roller, the roller of each roller module having a longitudinal axis that is coplanar with the longitudinal axes of the rollers of the other roller modules, the rollers having coplanar uppermost surfaces that define the stationary horizontal plane and that supports the object;
      ii. block means mounted to the frame for rotatingly supporting the roller with the longitudinal axis thereof stationary; and
      iii. motor means mounted to the block means for bidirectionally rotating the roller independently of the rotation of the rollers of all the other roller modules, the motor means of all the roller modules cooperating to rotate their respective rollers in selected combinations of directions to thereby impart selected rotational and translational motions to the object.

2. The rotate/translate conveyor module of claim 1 wherein:
   a. there are first, second, third and fourth roller modules attached to the frame; and
   b. the longitudinal axes of the rollers of the first and third roller modules are coaxial to create a first stationary common axis, and the longitudinal axes of the rollers of the second and fourth roller modules are coaxial to create a second stationary common axis, the first and second common axes intersecting at a point located between the first and third rollers and between the second and fourth rollers.

3. The rotate/translate conveyor module of claim 2 wherein the first and second stationary common axes intersect at an angle of 90 degrees to thereby enable the roller modules to impart translational motions in four orthogonal directions to the object.

4. A rotate/translate conveyor module comprising:
   a. a stationary frame; and
   b. roller means attached to the frame for defining a stationary horizontal plane and for supporting and imparting a plurality of selected rotational and transalational motion to an object along the plane, wherein the roller means comprises:
      i. a plurality of rollers having respective stationary longitudinal axes lying in a plane parallel to the horizontal plane, the rollers defining the stationary horizontal plane and supporting the object; and
      ii. motor means for individually rotating selected rollers in selected directions independently of all other rollers to translate the object in selected directions and to rotate the object about an axis perpendicular to the horizontal plane.

5. Apparatus for propelling an object along a stationary horizontal plane comprising:
   a. a stationary frame;
   b. a plurality of rollers mounted to the frame and defining respective longitudinal axes and having respective uppermost surfaces that define the horizontal plane and that support the object, the longitudinal axes of all the rollers intersecting each other at a common point; and
   c. motor means mounted to the frame for rotating the rollers independently of each other in a plurality of combinations of motions to impart a plurality of rotational and translational motions to the object.

6. The apparatus of claim 5 wherein there are four rollers mounted to the frame.

7. The apparatus of claim 6 wherein the longitudinal axes of the rollers intersect each other at 90 degrees.

8. The apparatus of claim 7 wherein the longitudinal axis of a selected one of the rollers makes an angle of 45 degrees with a selected translational motion of the object.

9. The apparatus of claim 5 further comprising side guide means mounted to the frame for selectively blocking at least one translational motion of the object along the horizontal plane.

10. The apparatus of claim 9 wherein the side guide means comprises lever means for pivoting between a lowered position located below the horizontal plane and a raised position located above the horizontal plane, the lever means being located to block a selected translational motion of the object when the lever means is in the raised position.

11. The apparatus of claim 9 wherein the side guide means comprises:
    a. a lever pivotally supported on the frame;
    b. actuator means pivotally supported to the frame for pivoting the lever between a raised position and a lowered position; and
    c. roller means supported on the lever for lying in and blocking object motion along a selected translational path when the actuator means pivots the lever to the raised position thereof and for lying below and permitting object motion along the selected translational path when the actuator means pivots the lever to the lowered position thereof.

12. The apparatus of claim 11 wherein the roller means guides the object along a second translational path at an angle of 90 degrees to the selected translational path when the actuator means pivots the lever to the raised position thereof.

13. In combination with a conveyor having an upstream conveyor section and at least one downstream conveyor section that define respective first and second generally horizontal coplanar paths along which an object is transported,
    a rotate/translate conveyor module located between the upstream and downstream conveyor sections comprising:
    a. a frame fixedly connected to the upstream and downstream conveyor sections; and
    b. roller means attached to the frame for defining a third stationary horizontal path coplanar with and intermediate the first and second paths, and for supporting and imparting selected rotational motions to an object about an axis perpendicular to the third path and selecfed translational motions to the object along the third path, wherein the roller means comprises:
       i. a plurality of rollers having respective longitudinal axes that lie in a common plane, the rollers supporting the object;
       ii. plate means for rotatingly supporting the rollers on the frame with the longitudinal axes of the respective rollers being stationary relative to the frame; and
       iii. motor means mounted to the plate means for individually rotating selected rollers independently of all other rollers in a plurality of selected combinations of direction to impart the selected rotational and translational motions to the object,
    so that the object can be propelled by the rotate/translate conveyor module between the upstream and downstream conveyor sections along the third path and the object can be rotated while it is on the rotate/translate conveyor module.

14. In combination with a conveyor having an upstream conveyor section and at least one downstream conveyor section that define respective first and second generally horizontal coplanar paths along which an object is transported,
    a rotate/translate conveyor module located between the upstream and downstream conveyor sections comprising:
    a rotate/translate conveyor module located between the upstream and downstream conveyor sections comprising:
    a. a frame fixedly connected to the upstream and downstream conveyor sections; and b. roller means attached to the frame for defining a third stationary horizontal path coplanar with and intermediate the first and second paths, and for supporting and imparting selected rotational motions to an object about an axis perpendicular to the third path and selected translational motions to the object along the third path, wherein the roller means comprises:
  i. a plurality of rollers that define respective longitudinal axes and that support the object, wherein the longitudinal axes of all the rollers intersect at a common point;
  ii. plate means for rotatingly supporting the rollers on the frame; and
  iii. motor means mounted to the plate means for selectively and individually rotating the rollers in a plurality of combinations of direction to impart the selected rotational and translational motions to the object.

15. In combination with a conveyor having an upstream conveyor section and at least one downstream conveyor section that define respective first and second generally horizontal coplanar paths along which an object is transported,
  a rotate/translate conveyor module located between the upstream and downstream conveyor sections comprising:
  a. a frame fixedly connected to the upstream and downstream conveyor sections; and
  b. roller means attached to the frame for defining a third stationary horizontal path coplanar with and intermediate the first and second paths, and for supporting and imparting selected rotational motions to an object about an axis perpendicular to the third path and selected translational motions to the object along the third path, wherein the roller means comprises:
    i. a first pair of rollers having respective longitudinal axes that are coaxial to form a first common longitudinal axis;
    ii. a second pair of rollers having respective longitudinal axes that are coaxial to form a second common longitudinal axis;
    iii. plate means for rotationally mounting the first and second pairs of rollers to the frame with the first and second common longitudinal axes thereof being stationary relative to the frame and with the first and second common longitudinal axes intersecting; and
    iv. motor means mounted to the plate means for rotating the rollers individually in selected directions independently of each other to thereby enable the rollers to impart selected rotational and translational motions to the object.

16. The combination of claim 15 wherein the first and second stationary common longitudinal axes intersect at 90 degrees.

17. The combination of claim 16 wherein the first stationary common longitudinal axis makes an angle of 45 degrees with the first horizontal path.

18. The combination of claim 16 further comprising:
  a. first side guide means for operating between a raised position to block translation of the object between the rotate/translate conveyor module and a selected one of the upstream conveyor section and the downstream conveyor section and a lowered position to allow translation of the object between the rotate/translate module and the selected upstream conveyor section or downstream conveyor section; and
  b. second guide means for operating independently of the first side guide means to guide an object that is translated between the rotate/translate conveyor module and the selected upstream conveyor section or downstream conveyor section when the first side guide means is operated to the lowered position thereof to allow translation of the object between the rotate/translate conveyor module and the selected upstream or downstream conveyor section.

19. A conveyor for transporting objects along a generally horizontal path comprising:
  a. an upstream conveyor section that defines a first path along which the objects are transported, the upstream conveyor section having a downstream end;
  b. a roatate/translate conveyor module joined to the downstream end of the upstream conveyor section, the rotate/translate conveyor module comprising a plurality of roller modules, each roller module comprising:
    i. a roller having a stationary longitudinal axis, the longitudinal axes of the respective rollers of the roller modules lying in a common plane, the rollers defining a second horizontal path that is a continuation of the first path; and
    ii. motor means for bidirectionally rotating the roller independently of the rotation of the rollers of the other roller modules, the motor means of the roller modules cooperating to rotate the respective rollers in a plurality of combinations of selected direction to impart a corresponding plurality of rotational and translational motions to an object supported on the rollers that enable the object to be translated from the upstream conveyor section onto the rotate/translate conveyor module and to be rotated on the rotate/translate conveyor module about an axis perpendicular to the second path; and
  c. at least one downstream conveyor section joined to the rotate/translate conveyor module and defining a third horizontal path that connects with the second path, the rollers of the rotate/translate conveyor modules being rotatable by the respective motor means to translate the object along the second path from the rotate/translate conveyor module onto the downstream conveyor section.

20. The conveyor of claim 19 wherein the longitudinal axis of each roller intersects the longitudinal axes of all the other rollers.

21. The conveyor of clam 19 wherein:
  a. there are first and second pairs of roller modules;
  b. the longitudinal axes of the rollers of the first pair of roller modules are coaxial, and the longitudinal axes of the rollers of the second pair of roller modules are coaxial; and
  c. the longitudinal axes of the rollers of the first and second pairs of roller modules intersect during all combinations of rotation of the rollers by their respective motor means.

22. The conveyor of claim 21 whrrein the longitudinal axes of the rollers of the first and second pairs of roller modules intersect at 90 degrees during all combination of rotation of the rollers by their respective motor means.

23. The conveyor of claim 21 wherein the longitudinal axes of the rollers of the first and second pairs of roller modules intersect at a point that is stationary relative to the frame.

24. The conveyor of claim 19 further comprising:
 a. first side guide means for selectively permitting and blocking translation of the object along the second path and for guiding translation of the object along the third path; and
 b. second side guide means for selectively permitting and blocking translation of the object along the third path and for guiding translation of the object along the second path, the second guide means blocking translation of the object along the third path and simultaneously guiding translation along the second path when the first side guide means permits translation of the object along the second path and blocks translation of the object along the third path, the first side guide means blocking translation of the object along the second path and simultaneously guiding the object along the third path when the second side guide means permits translation of the object along the third path.

25. A method of translating an object comprising the steps of:
 a. providing a plurality of rollers that have respective coplanar longitudinal axes and coplanar uppermost surfaces;
 b. arranging the rollers such that the longitudinal axis of each roller intersects the longitudinal axis of every other roller and such that the rollers define a generally horizontal first path; and
 c. rotating the rollers in a first combination of directions to translate the object along the first path.

* * * * *